(12) United States Patent
Tselikov et al.

(10) Patent No.: US 6,574,015 B1
(45) Date of Patent: Jun. 3, 2003

(54) OPTICAL DEPOLARIZER

(75) Inventors: Alexander Tselikov, Fremont, CA (US); Jeffrey P. Wilde, Los Gatos, CA (US); James Blake, Paradise Valley, AZ (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/314,240

(22) Filed: May 18, 1999

Related U.S. Application Data
(60) Provisional application No. 60/085,994, filed on May 19, 1998.

(51) Int. Cl.[7] .......................... H04K 3/00; H04B 10/00
(52) U.S. Cl. .................. 359/111; 359/156; 359/160; 359/161
(58) Field of Search ................ 359/156, 111, 359/160, 161; 360/114; 369/14, 112

(56) References Cited

U.S. PATENT DOCUMENTS

| | | |
|---|---|---|
| 3,659,915 A | 5/1972 | Maurer et al. |
| 3,737,236 A | 6/1973 | Borrelli |
| 3,859,643 A | 1/1975 | Borrelli |
| 3,900,247 A * | 8/1975 | Zaky .......................... 359/247 |
| 3,942,867 A | 3/1976 | Ono |

(List continued on next page.)

FOREIGN PATENT DOCUMENTS

| | | |
|---|---|---|
| EP | 01169746 | 7/1989 |
| EP | 0582405 | 2/1994 |
| EP | 0650133 | 4/1995 |
| JP | 59-117180 | 6/1984 |
| JP | 60-261052 | 12/1985 |
| WO | WO95/13638 | 5/1995 |
| WO | WO98/07060 | 2/1998 |
| WO | WO98/09280 | 3/1998 |
| WO | WO98/09285 | 3/1998 |
| WO | WO98/09289 | 3/1998 |

*Primary Examiner*—Leslie Pascal
*Assistant Examiner*—David C. Payne
(74) *Attorney, Agent, or Firm*—Robert P. Lenart, Esq.; Pietragallo, Bosick & Gordon

(57) ABSTRACT

A system and method for achieving, while using a laser and optical fibers, high signal-to-noise ratio. In particular, the system splits an incoming main light signal into two orthogonal polarization states, which then propagate through an optical circuit before recombining. The use of appropriate path differences ensures that the system is immune from the conversion of mode partition noise to intensity noise arising from the interference between parasitic light waves which traveled through the system in undesired polarization states.

34 Claims, 4 Drawing Sheets

U.S. PATENT DOCUMENTS

| | | |
|---|---|---|
| 4,135,083 A | 1/1979 | Van Alem et al. |
| 4,298,245 A | 11/1981 | Aulich et al. |
| 4,337,531 A | 6/1982 | Willemsen |
| 4,368,946 A | 1/1983 | Kaneko et al. |
| 4,449,204 A | 5/1984 | Shimada et al. |
| 4,460,989 A | 7/1984 | Russell |
| 4,460,998 A | 7/1984 | Yamada et al. |
| 4,510,544 A | 4/1985 | Lazzari |
| 4,532,619 A | 7/1985 | Sugiyama et al. |
| 4,539,519 A | 9/1985 | Ulrich et al. |
| 4,581,529 A | 4/1986 | Gordon |
| 4,626,066 A | 12/1986 | Levinson |
| 4,626,679 A | 12/1986 | Kuwayama et al. |
| 4,638,153 A | 1/1987 | Dakin |
| 4,683,421 A | 7/1987 | Miller et al. |
| 4,737,005 A | 4/1988 | Burns et al. |
| 4,740,951 A | 4/1988 | Lizet et al. |
| 4,796,226 A | 1/1989 | Valette |
| 4,799,210 A | 1/1989 | Wilson et al. |
| 4,806,885 A | 2/1989 | Morimoto |
| 4,847,823 A | 7/1989 | Lindow et al. |
| 4,866,372 A | 9/1989 | Aoshima et al. |
| 4,945,400 A | 7/1990 | Blonder et al. |
| 4,978,190 A | 12/1990 | Veith |
| 5,029,023 A | 7/1991 | Bearden et al. |
| 5,033,043 A | 7/1991 | Hayakawa |
| 5,034,679 A | 7/1991 | Henderson et al. |
| 5,039,220 A | 8/1991 | Arditty et al. |
| 5,093,884 A | 3/1992 | Gidon et al. |
| 5,111,326 A | 5/1992 | Ball |
| 5,119,361 A | 6/1992 | Tanabe |
| 5,120,953 A | 6/1992 | Harris |
| 5,135,295 A | 8/1992 | Jen et al. |
| 5,137,359 A | 8/1992 | Steele |
| 5,152,597 A | 10/1992 | Barnard |
| 5,161,133 A | 11/1992 | Levenson |
| 5,172,369 A | 12/1992 | Chikuma et al. |
| 5,191,387 A | 3/1993 | Ichikawa et al. |
| 5,212,583 A | 5/1993 | Vali et al. |
| 5,218,582 A | 6/1993 | Marchant |
| 5,229,834 A | 7/1993 | Lequime |
| 5,233,444 A | 8/1993 | Musha et al. |
| 5,245,491 A * | 9/1993 | Horie et al. ................. 360/114 |
| 5,272,330 A | 12/1993 | Betzig et al. |
| 5,278,812 A | 1/1994 | Adar et al. |
| 5,288,997 A | 2/1994 | Betzig et al. |
| 5,289,454 A | 2/1994 | Mohapatra et al. |
| 5,311,360 A | 5/1994 | Bloom et al. |
| 5,323,373 A | 6/1994 | Horimai |
| 5,325,116 A | 6/1994 | Sampsell |
| 5,347,297 A | 9/1994 | Gage |
| 5,383,048 A | 1/1995 | Seaver |
| 5,389,779 A | 2/1995 | Betzig et al. |
| 5,434,501 A * | 7/1995 | Esman et al. ................. 324/96 |
| 5,446,574 A | 8/1995 | Djupsjöbacka et al. |
| 5,448,548 A | 9/1995 | Taneya et al. |
| 5,477,323 A | 12/1995 | Andrews et al. |
| 5,483,607 A | 1/1996 | O'Keefe |
| 5,493,220 A | 2/1996 | Oliver et al. |
| 5,495,366 A * | 2/1996 | Esman et al. ................ 395/495 |
| 5,495,456 A | 2/1996 | Oka et al. |
| 5,495,464 A | 2/1996 | Fujikawa et al. |
| 5,521,999 A | 5/1996 | Chuang et al. |
| 5,535,189 A | 7/1996 | Alon et al. |
| 5,536,926 A | 7/1996 | Ikeda et al. |
| 5,546,482 A | 8/1996 | Cordova et al. |
| 5,625,483 A | 4/1997 | Swartz |
| 5,625,725 A | 4/1997 | Nakano et al. |
| 5,633,959 A | 5/1997 | Niki et al. |
| 5,644,397 A | 7/1997 | Blake |
| 5,742,419 A | 4/1998 | Dickensheets et al. |
| 5,822,100 A * | 10/1998 | Robinson et al. ........... 359/161 |
| 5,850,375 A * | 12/1998 | Wilde et al. ................. 369/14 |
| 5,930,414 A * | 7/1999 | Fishman et al. .............. 385/11 |
| 6,271,952 B1 * | 8/2001 | Epworth ..................... 359/161 |

* cited by examiner

OPTICAL DEPOLARIZER

RELATED APPLICATIONS

This application claims the benefit under 35 U.S.C. §119 (e) to U.S. Provisional Application Serial No. 60/085,994, James Blake, et al., filed on May 19, 1998, entitled "Noise Reduction In Fiber-Optic Magnetic Field Sensor," which is incorporated by reference in its entirety herein.

BACKGROUND OF INVENTION

1. Field of Technology

The present invention generally relates to optical systems. More specifically, the present invention relates to noise reduction in the transmission of optical signals.

2. Description of Background Art

In recent years, optical systems have become increasingly desirable for sensor applications as well as magneto-optical storage systems. In a magneto-optical (MO) storage system, a laser in conjunction with an optical fiber are used with a MO media to attain data storage densities beyond conventional magnetic data storage systems. This type of system relies upon propagating a light signal through an optical fiber and reflecting off of a MO media. Based upon the polarized logic state of the location on the MO media, which the light signal contacts, a Kerr effect slightly alters the polarization of the light signal, thereby enabling the light signal to carry the logic state of the MO media back to a differential detector. The differential detector transforms this polarized light signal into an electrical data signal, which is processed by a computing device, such as a personal computer.

In sensor systems, fiber optic current sensors include a sensing optical fiber, which is wound with an integral number of turns around a current carrying wire and with each point in the sensing fiber having a constant sensitivity to the magnetic field. Current flowing through the wire induces a magnetic field, which through the Faraday effect, rotates the plane of polarization of the light traveling in an optical fiber around the current carrying wire. This rotation of the state of polarization of the light due to the electrical current is measured by either injecting light with a well defined polarization state into the designated sensing region and analyzing the polarization state of the light after it exits this same sensing region or by measuring the velocity change of a circularly polarized light wave traversing the sensing region.

By utilizing a multi-mode laser and propagating a main light signal through a frequency selective polarization-maintaining (PM) optical fiber, slight unavoidable optical misalignment errors result in enhanced laser noise, such as mode partition noise (MPN) being converted into intensity and polarization noise, thus degrading the performance of the optical system. Even though the overall intensity noise of such a multi-mode laser is low, the noise present in each individual mode is very high.

One solution for minimizing MPN is to utilize a single-mode distributed feedback (DFB) laser, which does not generate these multiple modes within the system, thereby avoiding the effects of MPN. However, DFB lasers, which operate in the red spectral range and at high power levels, currently are not readily available on the commercial market. In addition, since multi-mode laser diodes are considerably less expensive compared to DFB lasers, multi-mode lasers are the preferred type of laser source for many optical systems.

What is needed is a system and method that utilizes the multi-mode laser, but minimizes the effects of MPN within the optical system.

SUMMARY OF INVENTION

Accordingly, the present invention overcomes the deficiencies of the prior art by providing a system and method that minimizes the mode-partition noise (MPN) contribution by depolarizing the noise generating parasitic light signals. In particular, a preferred embodiment of the system includes a multi-mode laser, a leaky beam splitter (LBS), a first half wave plate (HWP1), a second half wave plate (HWP2), a depolarizer, an optical fiber, a first quarter wave plate (QWP1), a second quarter wave plate (QWP2) and a differential detection module.

The multi-mode laser generates the main light signal, which is used as a read signal for carrying the polarization state of the main light signal from a specific location on the MO media or the sensing region to the differential detection module. The laser is modulated on and off at a radio frequency, which is dependent upon the optical path lengths associated with the depolarizer and the optical fiber. The depolarizer and the optical fiber are part of a continuous birefringent conduit for the polarization and propagation of the main light signal between the reflective medium or sensing region and the differential detection module.

The HWP1 and the HWP2 in conjunction with the QWP1 align and polarize the main light signal to ensure that the first and second components of the main light signal propagate along each optical path length of the depolarizer and each axis of the optical fiber By propagating along one optical path length and axis on a forward path and the opposing optical path length and axis on a return path from the reflective medium or sensing region, the two components of the main light signal will have a net zero optical path difference. To minimize MPN contribution, which is caused by the parasitic waves created by misaligned system components, the depolarizer depolarizes these parasitic light signals, so as to destroy coherent interference between the two parasitic light signals, which minimizes the MPN effects on the main light signal.

The LBS, which allows a main polarized mode of light to enter the depolarizer and the optical fiber on the forward path, reflects on the return path part of the main polarized mode and most of the perpendicularly polarized mode of the main light signal toward the differential detection module. The QWP2 reorients the reflected main light signal to ensure that the logic states within the main light signal are more easily detectable by the differential detection-module.

DETAILED DESCRIPTION OF PREFERRED EMBODIMENTS

Preferred embodiments of the present invention are now described with reference to figures where like reference numbers indicate identical or functionally similar elements and the left most digit of each reference number corresponds to the figure in which the reference number is first used.

Figure 1:
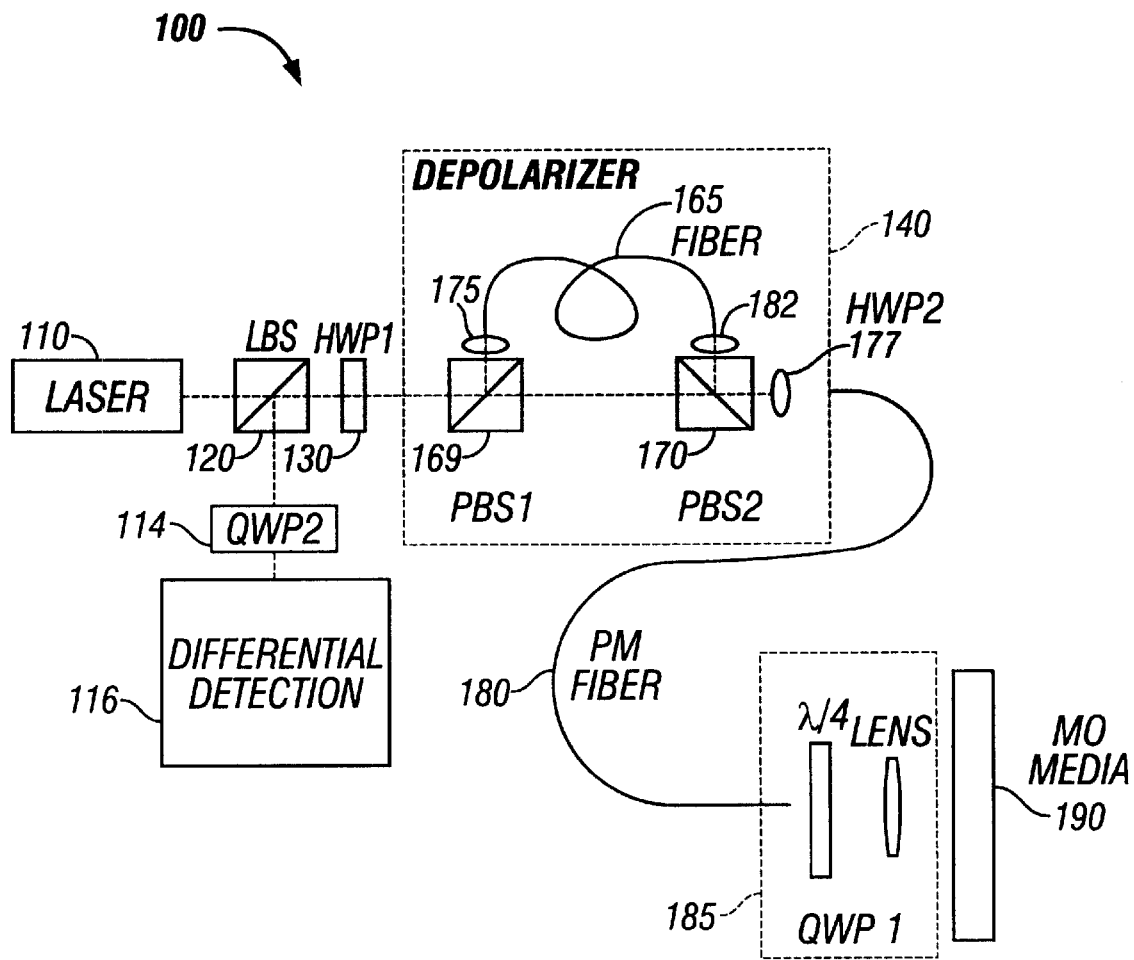
FIG. 1 illustrates a depolarizer of a preferred embodiment of the present invention.

FIG. 1 illustrates a low noise optical system 100 of a preferred embodiment of the present invention, which can be integrated into optical systems, such as magneto-optical (MO) storage devices that include a magnetic media with a reflective surface undeneath. The system 100 includes a multi-mode laser 110, a leaky beam splitter (LBS) 120, a first half-wave plate (HWP1) 130, a second half-wave plate (HWP2) 177, a first quarter wave plate (QWP1) 185, a second quarter wave plate (QWP2) 114, a depolarizer 140, a plurality of polarization-maintaining (PM) fibers 180, a magneto-optical (MO) media 190 and a differential detection module 116. To avoid unneeded complexity, only one PM fiber 180 Will be illustrated and primarily discussed. One skilled in the art will recognize that the same principles that apply to one PM fiber 180 also applies to multiple PM fibers 180. In addition, one skilled in the art will recognize that the same principles, which apply to a preferred embodiment, also will apply to alternative embodiments, such as the fiber optic current sensor, where MPN also must be minimized.

Figure 2:
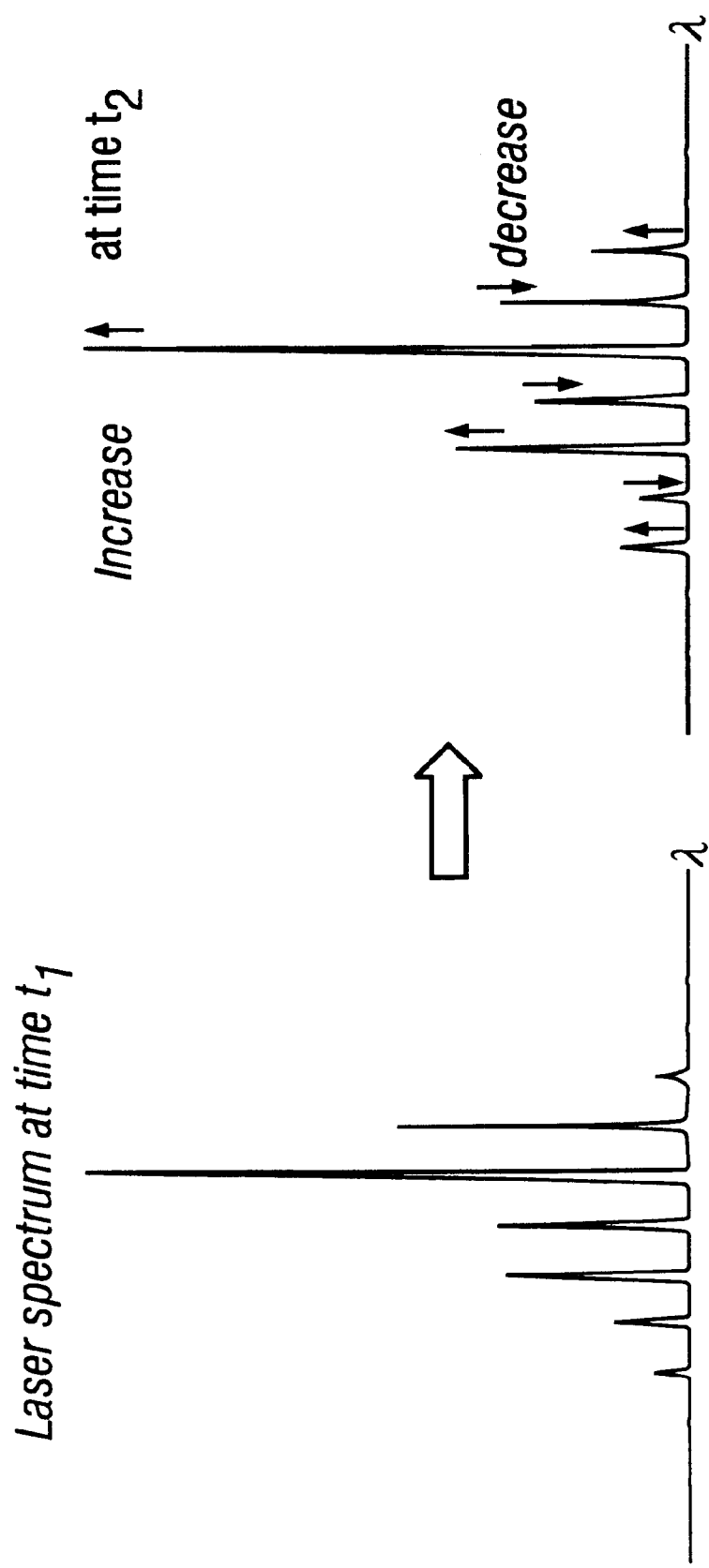
FIG. 2 illustrates multiple pulsed longitudinal mode signals of a preferred embodiment of the present invention.

As illustrated in FIG. 2, the multi-mode laser 110, which in a preferred embodiment is a Fabry-Perot (FP) laser diode, generates a signal comprising multiple pulsed longitudinal modes (main light), which transports data from the MO media 190 to the differential detection module 116. Due to the dynamic partitioning between the longitudinal modes, the light signal has a relatively constant power.

The LBS 120, which is coupled to the multi-mode laser 110, receives the main outgoing p-polarized light beam from the laser 110 and transmits most of this polarized light (e.g., approximately 80%) of the main light signal along a forward path toward the depolarizer 140 and the MO media 190.

In a preferred embodiment, the HWP1 130, which is coupled between the LBS 120 and a first end of the depolarizer 140, rotates the main light polarization by approximately 45 degrees to ensure that upon entering the depolarizer 140 on the forward path, the main light signal will split into two relatively equal components with the first component maintained as a p-polarized light (p-wave) signal and the second component transformed as an s-polarized light (s-wave) signal. For illustrative purposes only, the p-wave will be presumed to propagate along a short optical path length of the depolarizer 140 and the s-wave signal is presumed topropagate along a long optical pathlength of the depolarizer 140.

Figure 3:
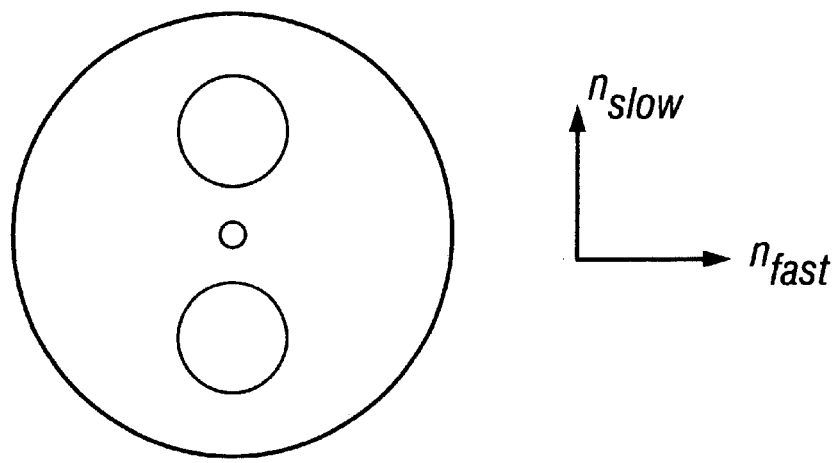
FIG. 3 illustrates a birefringent optical fiber of a preferred embodiment of the present invention.
Figure 4:
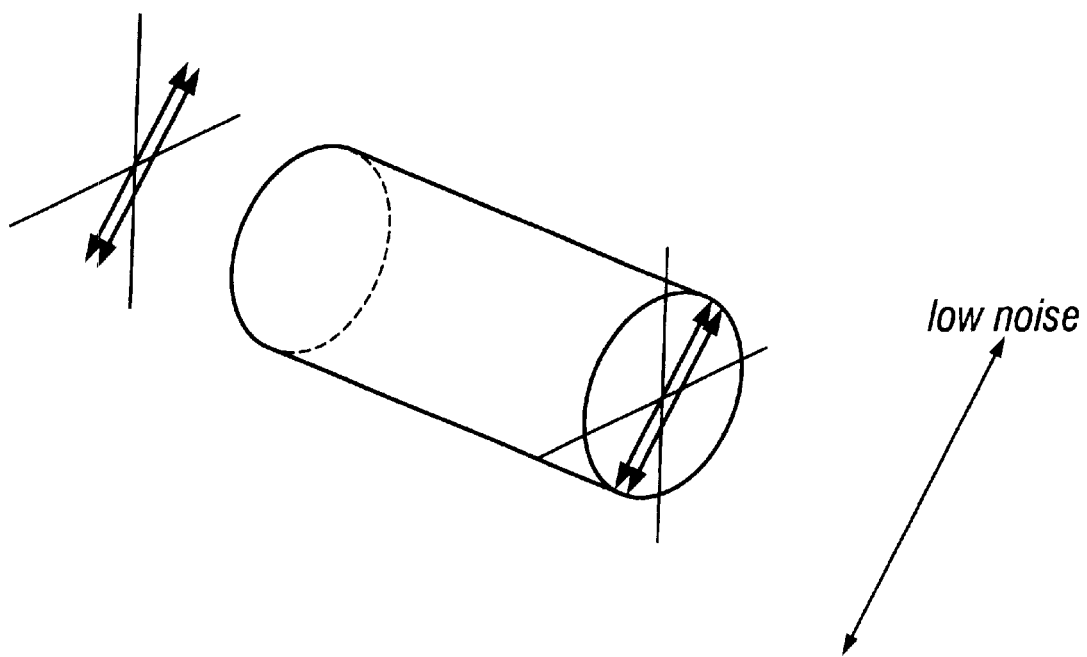
FIG. 4 illustrates coherent interference of parasitic light signals of a preferred embodiment of the present invention.

The HWP2 177, which is coupled between a second end of the depolarizer 140 and a first end of the PM fiber 180, aligns the p-wave signal and the s-wave signal, which exit the depolarizer 140, with the birefringent ($\Delta n_B = n_{slow} - n_{fast}$) axes of the PM fiber 180 that are illustrated in FIG. 3. In particular, the HWP2 177 aligns the s-wave signal to propagate along the slow axis $n_{slow}$ of the PM fiber 180 and the p-wave signal to propagate along the fast axis $n_{fast}$ of the PM fiber 180. In alternative embodiments the s-wave and p-wave signals are aligned to propagate along the opposite axes.

Since the slow axis of the PM fiber 180 has a refractive index, which is larger than the refractive index of the fast axis, the s-wave signal will propagate along the slow axis at a slower phase velocity, which corresponds to a longer optical path length than the optical path length of the fast axis. These differing optical path lengths in both the depolarizer 140 and the PM fiber 180 result in a forward optical path length difference and corresponding time delay between the s-wave signal and the p-wave signal.

The QWP1 185 receives, reorients by 90 degrees and retransmits the main light signal on a return path through the opposite axes of the PM fiber 180 and opposite optical paths of the depolarizer 140. In particular, the QWP1 185 is aligned at 45° with respect to the fiber axes so that the QWP1 185 converts the two linearly polarized components, the s-wave signal and the p-wave signal, into left and right circularly polarized states. Upon reflection from the MO media 190, the senses of the two circular states of the components are reversed (e.g., right polarization becomes left polarization and left polarization becomes right polarization). After passing through QWP1 185 on the return path, the circular states of the components are converted back into linear states, but with a 90° rotation in the polarization state. This rotation results in each component propagating on the return path upon an opposing axis and optical path length, thereby compensating for the path difference effects of the forward path difference by equalizing the net optical path length difference of each component. For example, the first component of the main light signal, which originally propagated as a p-wave signal on the forward path along the short optical path length of the depolarizer 140 and along the fast axis of the PM fiber 180, now propagates on the return path as an s-wave signal along the slow axis of the PM fiber 180 and the long optical path length of the depolarizer 140. The original s-wave signal, which is now a p-wave signal, propagates on the return path along the fast axis of the PM fiber 180 and the short optical path length of the depolarizer 140. By having each component of the main light signal propagate down one optical path length of the depolarizer 140 and one axis of the PM fiber 180 on the forward path and the opposite optical path length and axis on the return path, the recombined main light signal, which exits the first end of the depolarizer 140 does not experience a net optical path difference like the main light signal exiting the second end of the PM fiber 180. This lack of a significant net optical path difference in the main light signal results in the minimization of the optical path length difference between the two components of the main light signal, thereby minimizing the conversion of MPN to intensity noise. In particular, at the end of the round trip propagation through both the depolarizer 140 and the PM fiber 180, the two portions of the main light signal will have propagated the equal combined length of both optical path lengths of the depolarizer 140 and both axes of the PM fiber 180, thereby resulting in the light having a stable polarization state at the original entrance into the depolarizer 140.

Even though the system 100 ideally can eliminate the optial path length difference and the corresponding time delay between the two components of the main light signal by providing a net optical path difference of zero, unavoidable misalignment errors within the system 100 as well as manufacturing process, aging and temperature variations cause a parasitic light signal to develop and significantly affect the ability of the main light signal to transport data. In particular, errors in the thickness or the rotational alignment of the QWP1 185 and the alignment between the PM fiber 180 and the depolarizer 140 will produce parasitic light signals. For example, the main light signal, after leaving the PM fiber 180 in the forward path, passes through QWP1 185, reflects off of the MO disk 190 and once again propagates through QWP1 185. Double passing QWP1 185 converts the outgoing s-wave signal into a p-wave signal on the return path and the outgoing p-wave signal into an s-wave signal on the return path. To the extent that QWP1

185 has errors in either its retardation (e.g., its phase shift departs from 90 degrees) or its 45 degree orientation, parasitic light signals will exist. These parasitic light signals correspond to that portion of the outgoing light that is not properly converted by QWP1 185, namely outgoing s-waves that propagate on the return path as s-waves and outgoing p-waves that propagate on the return path asp-waves. In such a situation, while each polarization component of the main light signal, propagates along an equal optical path length, each component of the parasitic light signal only travels along one of the two optical paths lengths. This difference in the optical path lengths of these two parasitic light signals results in the creation of interference between the two parasitic light signals, which causes MPN to be converted to intensity noise.

In a preferred embodiment, a misalignment sensitivity between the PM fiber 180 and the depolarizer 140 is avoided by grouping all of the PM fibers 180 into an array such that all of the axes of the PM fibers 180 are well aligned (e.g., with less than 1 degree of error) with respect to one another. An alternative embodiment for avoiding misalignment between the PM fibers 180 and the depolarizer 140 is to utilize a dynamic electrically controlled polarization rotator (e.g., by placing HWP2 177 on an electrically controlled rotation stage or by replacing HWP2 177 with a nematic liquid crystal cell used in combination with a quarter-wave plate) that can be used between the depolarizer 140 and the first end of the PM fiber 180 to provide active alignment for switching between PM fibers 180.

The sensitivity of the noise performance of a non-ideal QWP1 185 is minimized by making parasitic light signals incoherent to avoid interference. As previously discussed, the parasitic light signal, which is generated by the QWP1 185, propagates on the return path along the same axis and optical path length as the corresponding portion of the main light signal originally propagated along in the forward path. By failing to travel on the opposite axis and optical path length, this parasitic light signal experiences a net optical path length difference which causes the parasitic light signals to interfere with the main light signal and with each other. Fortunately, the errors caused by the interference between each parasitic wave and the main wave are equal and opposite and thus cancel. However, the error created by the interference between the two parasitic waves remains.

In particular, the parasitic light signal on one axis and the parasitic light signal on the opposite axis will, upon recombining, produce a wavelength dependent polarization state which results in strong conversion of MPN into the polarization noise, which causes the differential detection module 116 to have difficulty detecting the data transported by the main light signal.

The depolarizer 140 eliminates the effects of MPN and increases the tolerance of misalignments in the optical components (primarily QWP1 185) by relying upon a significantly large optical path difference, which depolarizes the parasitic light signals and allows for the coherent interference between the parasitic light signals to be destroyed thereby minimizing the effects of MPN on the main light signal. Since the parasitic light signals propagate along different fiber lengths and optical path lengths on the return path than the corresponding portion of the main light signal, a p-wave parasitic light signal would propagate a shorter optical path length and an s-wave parasitic light signal would propagate a longer optical path length. This difference in the net optical path length between the two parasitic light signals results in the p-wave parasitic light signal becoming depolarized with regard to the s-wave parasitic light signal.

In a preferred embodiment, the depolarizer 140 comprises a first polarization beam splitter (PBS1) 169, a second polarization beam splitter (PBS2) 170, an optical fiber 165 a first lens 175 and a second lens 182. Prior to the main light signal entering the depolarizer 140 on the forward path, the HWP1 130 orients the light signal by 45 degrees to ensure that the PBS1 169, which is coupled to the HWP1 130, receives and splits the main light signal into two equal-amplitude components with the transmitted component, a p-wave signal, and the reflected. component, an s-wave signal. The depolarizer 140 then allows the s-wave signal to propagate along the long optical path length by redirecting the s-wave signal to travel through the first lens 175, onto the optical fiber 165, and through the second lens 182. In a preferred embodiment the first lens 175 and the second lens 182 are graded index (GRIN) lenses (e.g., with a 0.25 pitch). The first lens 175 accepts and outputs a collimated free-space beam of the appropriate diameter into the optical fiber 165. In a preferred embodiment, the optical fiber 165 of the depolarizer 140 can be a polarizing fiber (e.g., PZ fiber), a PM fiber, or a low-birefringence (Lo-Bi) fiber. The primary constraint for a preferred embodiment is that the optical fiber 165 must propagate a single linear polarization state (e.g., s-wave signal) with a high extinction ratio.

The p-wave signal propagates along the short optical path length by direct transmission through PBS1 169 and PBS2 170. The PBS2 170 receives both the s-wave signal from the second lens 182 and the p-wave signal, recombines them back into the main light signal and directs the main light signal through the HWP2, 177 (or an equivalent polarization rotator) into one of the set of PM fibers 180, which effectively acts as an extension of the depolarizer 140. In particular, the alignment between the depolarizer 140 and the PM fiber 180 by the HWP2 177 results in the s- and p-waves entering onto either the fast or slow fiber axis of the PM fiber 180. Either fiber axis can be used for the s- or p-waves.

Figure 5:
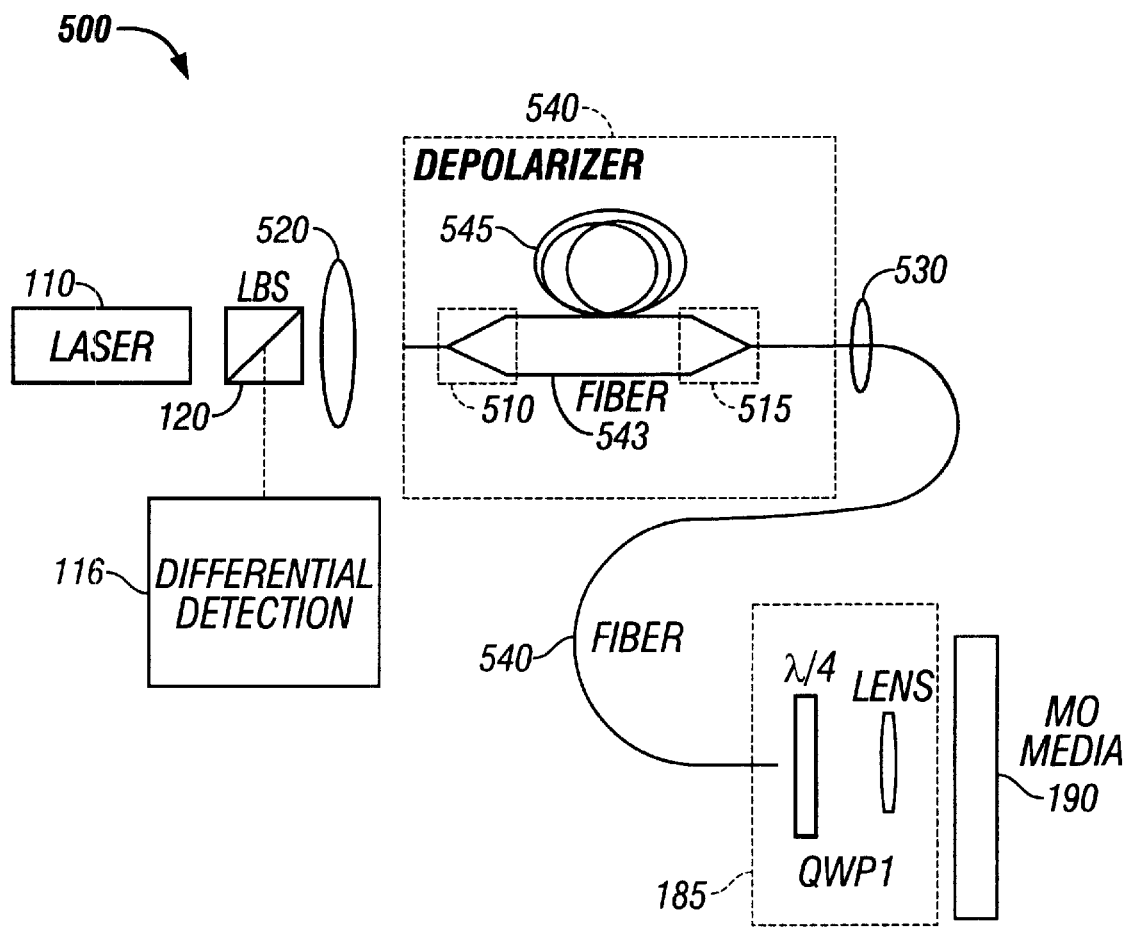
FIG. 5 illustrates an all fiber depolarizer of an alternative embodiment of the present invention.

FIG. 5 illustrates an alternative embodiment of the system 500 with an all-fiber version of the depolarizer 540. In particular, this depolarizer 540 comprises polarization beam splitters 510, 515 which function in a similar manner as the PBS 169, 170. The long optical path length of the depolarizer 540 is provided by optical fiber 545, while the small optical path length of the depolarizer 540 is provided by optical fiber 543. The axes of optical fiber 540 are aligned in such a manner that the main light signal propagates along one (e.g., fast) axis of the PM fiber on the forward path and the opposite (e.g., slow) axis on the return path. In particular, the polarization of the components of the main light are swapped upon double pass through the QWP1 185. As in the previous scheme, due to the imperfectness of the QWP1 185, there also will be two parasitic light signals that travel the same axis on the return path as the corresponding component of the main light signal propagated along the forward path of this system 500. As the parasitic light signal also propagates along the same optical fiber on the return path as the corresponding component of the main light signal propagated on the forward path, these parasitic light signals interfere at the output of the first polarization beam splitter 510 and interfere with the main light signal. In addition, to ensure that this system 500 is compatible with collimated free-space operation, the first GRIN lens 520 and the second GRIN lens 530 are placed at the input and the output of the fibers 543 and 545. This all fiber depolarizer 540 approach eases the difficulty of alignment of the components compared to the free-space version of FIG. 1.

To avoid reflections from the end surfaces of the optical fibers 540, 543, 545, which could increase the MPN in the system 500, the ends of these optical fibers 540, 543, 545 are angle-cleaved and carefully aligned with the GRIN lenses 520 and 530. When compared to straight-cleaved optical fibers, angle-cleaved optical fibers of a preferred embodiment generally result in the forward coupling efficiency for the system 500 to be as high as approximately 70–80%. End face reflections from straight-cleaved fibers also can be eliminated by using indexmatching epoxy between the GRIN lenses 520 and 530 and the ends of the fibers 540, 543, 545. In an alternative embodiment, this system 500 also could be constructed from one long piece of PM fiber, but the corresponding length of optical fiber would be approximately 1 kilometer.

In a second approach for minimizing the conversion of MPN to polarization noise, the differential round-trip polarization delay between the two parasitic waves may be made to be substantially an integer times the double-pass delay in the multi-mode laser diode cavity 110. Equivalently, the optical path length difference between the s- and p- paths extending from the PBS 169 through QWP1 185, may be made to be substantially an integer times the single pass delay of the laser cavity 110. When this condition is satisfied, the phase of the interference between the two parasitic waves is the same for each longitudinal mode of the multi-mode laser diode light source 110, i.e., the parasitic light waves interfere coherently with each other. Thus, as the energy temporally exchanges between the modes of light source 110, the resultant interference of the parasitic waves does not substantially change because the parasitic wave interference does not produce noise. It should be noted that in this embodiment, the parasitic waves do interfere to give an output signal. However, this output only changes as the optical path length difference between the s- and p- paths change, rather than with the hopping of the light-source modes. In particular, changes in the optical path length difference are slow with time because the changes are largely dependent on temperature and strain effects in the optical fibers 543 and 545, whereas for mode hopping, the phenomenon is rapid. Thus, in this embodiment of the present invention, the polarization noise associated with the parasitic waves is relegated to a low frequency band, which is below the band of interest for the applications.

The foregoing description of the preferred embodiments has been presented for purposes of illustration and description. It is not intended to be exhaustive nor to limit the invention to the precise form disclosed. Many modifications and variations are possible in light of the above teaching. For example, even though a preferred embodiment focuses upon the depolarizer 140 having a short optical path length with a refractive index equal to air, alternative embodiments of the present invention achieve the same necessary frequency-dependent optical path differences by utilizing other substances with varying refractive indices. Preferred embodiments were chosen and described to best explain the principles of the present invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. A low noise optical system coupled to a light source having a time varying optical spectrum for generating a main light signal, the system comprising:
   a first beam splitter adapted to receive the main light signal from the light source and to transmit a first component signal and a second component signal, the first component signal including a first portion of the main light signal and the second component signal including a second portion of the main light signal;
   a first conduit including a first optical path length, a first end and a second end, coupled at the first end the first conduit to the first beam splitter, adapted to propagate on the forward path the first component signal and on the return path a third component signal, said third component signal including the second portion of the main light signal and a first parasitic light signal;
   a second conduit including a second optical path length, a first end and a second end, coupled at the first end of the second conduit to the first beam splitter, adapted to propagate on the forward path the second component signal and on the return path a fourth component signal, the fourth component signal including the first portion of the main light signal and a second parasitic light signal, the second optical path length including a longer optical length than the first optical path length and a physical length difference between the first and second optical path lengths is determined by the optical spectrum of the light source, adapted to cause depolarization of the first parasitic light signal and the second parasitic light signal resulting in the destruction of coherent interference between the first parasitic light signal and the second parasitic light signal.

2. The system of claim 1 further comprising a second beam splitter, coupled to the second end of the first conduit and the second end of the second conduit, adapted to receive the first component signal and the second component signal and to transmit the main light signal.

3. The system of claim 1 wherein the first conduit and the second conduit include free-space propagation in a refractive index approximately equal to the refractive index of air.

4. The system of claim 1 wherein the second conduit includes a fiber collimator.

5. The system of claim 1 wherein the first conduit and the second conduit each include an optical fiber.

6. The system of claim 1 wherein depolarization is achieved by establishing a physical length difference between the second optical length and the first optical length related to the linewidth of each individual mode of the light source.

7. The system of claim 1 wherein depolarization is achieved by establishing a physical length difference between the first optical length and the second optical length that is at least the coherence length of the light source and related to the linewidth of each individual mode of the light source.

8. The system of claim 1 wherein the first beam splitter includes a polarization beam splitter.

9. The system of claim 1 wherein the first beam splitter includes a polarization maintaining fiber splitter.

10. The system of claim 9 further comprising a first graded index lens, coupled to the polarization maintaining splitting fiber, adapted to direct the propagation along the forward path of the main light signal through the polarization maintaining splitting fiber.

11. The system of claim 2 further comprising a quarter wave plate, coupled to the second beam splitter, adapted to reorient the main light signal so that the second beam splitter on a return path splits the main light signal into the third component signal and the fourth component signal.

12. The system of claim 1 further comprising a reflective media, coupled to the second end of the first conduit and the second end of the second conduit, adapted to redirect the main light signal from the forward path to the return path.

13. The system of claim 12 wherein said reflective media includes a magneto-optical media adapted to transfer to the main light signal by the Kerr effect logic state information that is magnetically stored on the magneto-optical media.

14. The system of claim 1 further comprising a third conduit including a first end, a second end, a third optical length and a fourth optical length, said first end of said third conduit coupled to said second end of said first conduit and said second end of said second conduit, adapted to propagate the main light signal and the first parasitic light signal and the second parasitic light signal.

15. The system of claim 14 wherein said third conduit includes an optical fiber.

16. The system of claim 15 wherein the optical fiber includes a polarization maintaining optical fiber with the fourth optical length representing a fast axis of the polarization maintaining fiber and the third optical length representing a slow axis of the polarization maintaining fiber.

17. The system of claim 1 further comprising a first half wave plate, coupled to the first beam splitter, adapted to orient the polarization of the main light signal propagating on the forward path to cause the first beam splitter to equally split the main light signal into the first component signal and the second component signal.

18. The system of claim 14 further comprising a first half wave plate, disposed between the second end of the first conduit, the second end of the second conduit and the first end of the third conduit, adapted to orient the main light signal on the forward path to enable the first end of the third conduit to equally split the main light signal into the first component signal for propagating along the third optical path length and the second component signal for propagating along the fourth optical path length.

19. The system of claim 1 further comprising a leaky beam splitter, coupled to the first beam splitter, adapted to receive the main light signal with two polarization states from the light source and to transmit the main light signal with approximately one polarization state to the first beam splitter.

20. The system of claim 13 further comprising a differential detection module, coupled to the first beam splitter, adapted to detect the logic state information contained within the main light signal propagating on the return path.

21. The system of claim 1 further comprising a quarter wave plate, coupled to the first beam splitter, adapted to circularly polarize the main light signal propagating on the return path.

22. An optical system, coupled to a light source having a time varying optical spectrum, for minimizing the effects of mode partition noise on a main light signal, the system comprising:
 an optical fiber, adapted to propagate a main light signal; and
 a depolarizer, coupled to the optical fiber, having a first optical path length and a second optical path length different from the first optical path length, wherein a physical length difference between the first optical path length and the second optical path length is determined by the optical spectrum of the light source, and wherein the depolarizer transmits a first parasitic light signal along the first optical path length and a second parasitic light signal along the second optical path length to minimize coherent interference between the first parasitic light signal and the second parasitic light signal.

23. A method for reducing the effects of mode partition noise, the method comprising the steps of:
 splitting a main light signal received from a light source having a time varying optical spectrum into a first component signal and a second component signal;
 propagating the first component signal on the forward path through a first conduit;
 propagating the second component signal on the forward path through a second conduit, wherein the second conduit includes a longer optical path length than the first conduit and a physical length difference between the first and second optical path lengths is determined by the spectral properties of the light source;
 transforming the first component signal into a fourth component signal, said fourth component signal including the first component signal and a first parasitic light signal;
 propagating the fourth component signal on the return path through the second conduit;
 propagating the third component signal on the return path through the first conduit; and
 combining the third component signal with the fourth component signal to reform the main light signal, wherein coherent interference between the first parasitic light signal and the second parasitic light signal is minimized.

24. The method of claim 23 further comprising the step of redirecting the main light signal from the forward path to the return path.

25. The method of claim 23 further comprising the step of transferring logic state information stored magnetically on a magneto-optical media to the main light signal by relying upon the Kerr effect.

26. The method of claim 23 further comprising the step of propagating on the forward path the first component signal and the second component signal through a polarization maintaining optical fiber and propagating on the return path the third component signal and the fourth component signal through the polarization maintaining fiber.

27. The method of claim 23 further comprising the step of orienting the main light signal propagating on the forward path to cause a first beam splitter to split the main light signal into the first component signal and the second component signal.

28. The method of claim 23 further comprising the step of detecting the logic state transported within the main light signal.

29. A method for reducing the effects of mode partition noise, the method comprising the steps of:
 splitting a main light signal received from a light source having a time varying optical spectrum into a first component signal and a second component signal;
 propagating the first component signal through a first conduit;
 propagating the second component signal through a second conduit having an optical path length different from the first conduit and a physical length of the first conduit and the second conduit determined by the spectral properties of the light source;
 depolarizing a first parasitic light signal from the second component signal and a second parasitic light signal from the first component light signal to cause coherent interference between the first parasitic light signal and the second parasitic light signal; and
 combining the first component signal with the second component signal to reform the main light and to minimize coherent interference between the first parasitic light signal and the second parasitic light signal.

30. A low noise optical system coupled to a light source having a time varying optical spectrum for generating a main light signal, the system comprising:

a first beam splitter adapted to receive the main light signal from the light source and to transmit a first component signal and a second component signal, the first component signal including a first portion of the main light signal and the second component signal including a second portion of the main light signal;

a first conduit including a first optical path length, a first end and a second end, coupled at the first end of the first conduit to the first beam splitter, adapted to propagate on the forward path the first component signal and on the return path a third component signal, said third component signal including the second portion of the main light signal and a first parasitic light signal; and a second conduit including a second optical path length, a first end and a second end, coupled at the first end of the second conduit to the first beam splitter, adapted to propagate on the forward path the second component signal and on the return path a fourth component signal, the fourth component signal including the first portion of the main light signal and a second parasitic light signal, the second optical path length including a longer optical length than the first optical path length adapted to cause coherent interference between the first parasitic light signal and the second parasitic light signal to minimize the conversion of mode partition noise to, polarization noise.

31. The system of claim 30 wherein the optical path difference between the first conduit and the second conduit equals an integer times a single pass delay in a cavity of the light source.

32. A method for propagating a main light signal comprising the steps of:

receiving the main light signal from the light source;

transmitting a first component signal and a second component signal, the first component signal including a first portion of the main light signal and the second component signal including a second portion of the main light signal;

propagating through a first conduit, including a first optical path length, on the forward path the first component signal and on the return path a third component signal, said third component signal including the second portion of the main light signal and a first parasitic light signal; and propagating through a second conduit, including a second optical path length, on the forward path the second component signal and on the return path a fourth component signal, the fourth component signal including the first portion of the main light signal and a second parasitic light signal, the second optical path length including a longer optical length than the first optical path length adapted to cause coherent interference between the first parasitic light signal and the second parasitic light signal to minimize the conversion of mode partition noise to polarization noise.

33. The optical system of claim 22 wherein a first component of the main light signal propagates along the first optical path length on a forward path and the second optical path length on a return path and a second component of the main light signal propagates along the second optical path length on the forward path and the first optical path length on the return path.

34. The optical system of claim 33 wherein the first parasitic light signal propagates along the first optical path length on the return path and the second parasitic light signal propagates along the second optical path length on the return path.

* * * * *

UNITED STATES PATENT AND TRADEMARK OFFICE
CERTIFICATE OF CORRECTION

PATENT NO.     : 6,574,015 B1
DATED          : June 3, 2003
INVENTOR(S)    : Alexander Tselikov, Jeffrey P. Wilde and James Blake It is certified that error appears in the above-identified patent and that said Letters Patent is hereby corrected as shown below:

Column 2,
Line 31, "fiber By" should read -- fiber. By --.

Column 3,
Line 16, "Will" should read -- will --.
Line 48, "topropogate" should read -- to propogate --.
Line 48, "pathlength" should read -- path length --.

Column 4,
Line 51, "optial" should read -- optical --.

Column 5,
Line 7, "asp-waves" should read -- as p-waves --.

Column 6,
Line 29, "HWP2, 177" should read -- HWP2 177 --.

Column 7,
Line 8, "indexmatching" should read -- index-matching --.

Column 8,
Line 5, "end the first" should read -- end of the first --.

Column 10,
Line 8, between ". . . by the spectral properties of the light source;" and "transforming the first component signal into a fourth . . ." should read -- transforming the second component signal into a third component signal, said third component signal including the second component signal and a second parasitic light signal; --.

UNITED STATES PATENT AND TRADEMARK OFFICE
CERTIFICATE OF CORRECTION

PATENT NO. : 6,574,015 B1
DATED : June 3, 2003
INVENTOR(S) : Alexander Tselikov, Jeffrey P. Wilde and James Blake It is certified that error appears in the above-identified patent and that said Letters Patent is hereby corrected as shown below:

Column 11,
Line 25, "to, polarization" should read -- to polarization --.

Signed and Sealed this

Nineteenth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,574,015 B1
APPLICATION NO. : 09/314240
DATED : June 3, 2003
INVENTOR(S) : Alexander Tselikov, Jeffrey P. Wilde and James Blake It is certified that error appears in the above-identified patent and that said Letters Patent is hereby corrected as shown below:

<u>Title Page</u>
Assignee should read:
(73) Assignee:  Seagate Technology LLC, Scotts Valley, CA (US)
              The Texas A&M University System, College Station, TX (US)

Signed and Sealed this

Twenty-eighth Day of August, 2007

JON W. DUDAS
*Director of the United States Patent and Trademark Office*